United States Patent
Becker

(10) Patent No.: US 9,840,117 B2
(45) Date of Patent: Dec. 12, 2017

(54) DEVICE FOR CONTROLLING THE PRESSURE IN A VEHICLE TYRE

(71) Applicant: PressureRite (Pty) Ltd., Cape Town (ZA)

(72) Inventor: Pierre Van Wyk Becker, Cape Town (ZA)

(73) Assignee: PressureRite (Pty) Ltd., Cape Town (ZA)

( * ) Notice: Subject to any disclaimer, the term of this patent is extended or adjusted under 35 U.S.C. 154(b) by 0 days.

(21) Appl. No.: 15/038,464

(22) PCT Filed: Nov. 20, 2014

(86) PCT No.: PCT/IB2014/066188
§ 371 (c)(1),
(2) Date: May 22, 2016

(87) PCT Pub. No.: WO2015/075656
PCT Pub. Date: May 28, 2015

(65) Prior Publication Data
US 2016/0288592 A1    Oct. 6, 2016

(30) Foreign Application Priority Data

Nov. 22, 2013  (ZA) .................................. 2013/08794

(51) Int. Cl.
*B60C 23/12* (2006.01)
*F16D 27/06* (2006.01)
(Continued)

(52) U.S. Cl.
CPC .......... *B60C 23/004* (2013.01); *B60C 23/007* (2013.01); *B60C 23/12* (2013.01);
(Continued)

(58) Field of Classification Search
CPC ..... B60C 23/004; B60C 23/007; B60C 23/12; F16D 27/06; F04B 35/01; F04B 37/10
See application file for complete search history.

(56) References Cited

U.S. PATENT DOCUMENTS 895,838 A      8/1908  Booth
1,349,671 A *  8/1920  Hultin ................... B60C 23/12
                                                152/420
(Continued)

FOREIGN PATENT DOCUMENTS

WO    WO 0236369 A1 *  5/2002  ........... B60C 23/004
WO    WO 2015/075656   5/2015

OTHER PUBLICATIONS

International Search Report and the Written Opinion Dated Feb. 11, 2016 From the International Searching Authority Re. Application No. PCT/IB2014/066188.

*Primary Examiner* — Kip T Kotter

(57) ABSTRACT

A device (10) for providing air under pressure to a rotating pneumatic tire is disclosed. The device comprises a pump (48, 50, 58) which in use rotates with the tire and which provides air under pressure to the tire when the pump is activated. There is a pump drive system for activating the pump upon a loss of pressure in the tire. The pump drive system includes a connecting rod (52) which is rotationally connected to the tire and an eccentric body (32) which rotates with the rod when the pump is inactive. The eccentric body is inhibited from rotating with the rod to activate the pump. Relative rotation between the rod and the eccentric body drives the pump to provide air under pressure to the tire. An electromagnetic clutch is provided which has a first plate (26) which is non-rotatable and a second plate (36) which rotates with the body. The first plate is connected to the second plate electromagnetically when the clutch is engaged to prevent rotation of the second plate and hence of the connecting rod.

6 Claims, 2 Drawing Sheets

(51) Int. Cl.
    *F04B 37/10*      (2006.01)
    *F04B 35/01*      (2006.01)
    *B60C 23/00*      (2006.01)

(52) U.S. Cl.
    CPC ............. *F04B 35/01* (2013.01); *F04B 37/10*
                     (2013.01); *F16D 27/06* (2013.01)

(56) References Cited

U.S. PATENT DOCUMENTS

| | | | | |
|---|---|---|---|---|
| 1,571,072 | A * | 1/1926 | Talbert | B60C 23/12 |
| | | | | 152/420 |
| 2,213,539 | A * | 9/1940 | Wiegand | B60C 23/003 |
| | | | | 152/416 |
| 8,435,012 | B2 * | 5/2013 | Clinciu | F04B 35/01 |
| | | | | 152/418 |
| 9,151,288 | B2 * | 10/2015 | Richardson | F04C 25/00 |
| 9,434,218 | B2 * | 9/2016 | Root | B60C 23/041 |
| 2014/0271261 | A1 * | 9/2014 | Boelryk | F04B 27/0404 |
| | | | | 417/233 |
| 2015/0191058 | A1 * | 7/2015 | van Wyk Becker | B60C 23/0408 |
| | | | | 152/419 |
| 2015/0239309 | A1 * | 8/2015 | Root | B60C 23/041 |
| | | | | 152/419 |
| 2016/0250902 | A1 * | 9/2016 | Becker | B60C 23/12 |
| | | | | 152/419 |
| 2016/0263949 | A1 * | 9/2016 | Miu | B60C 23/12 |

* cited by examiner

DEVICE FOR CONTROLLING THE PRESSURE IN A VEHICLE TYRE

RELATED APPLICATIONS

This application is a National Phase of PCT Patent Application No. PCT/IB2014/066188 having International filing date of Nov. 20, 2014, which claims the benefit of priority of South African Patent Application No. 2013/08794 filed on Nov. 22, 2013. The contents of the above applications are all incorporated by reference as if fully set forth herein in their entirety.

FIELD AND BACKGROUND OF THE INVENTION

This invention relates to self-contained devices for maintaining pressure in rotating elements, such as vehicle tyres.

Devices for maintaining vehicle tyre pressure are disclosed in U.S. Pat. No. 7,013,931 and in PCT Application No. PCT/IB2013/054732, (published as WO 2014/009822). The devices are attached to vehicle wheels and each includes a hanging, stationary counterweight, while the remainder of the device normally rotates with the wheel. When a tyre on the vehicle wheel loses pressure, a part of the device becomes connected to the counterweight by a pneumatically operated friction clutch, so that it becomes stationary. Relative motion between the part that is stationary and the remainder of the device is used to drive a pump that pressurises the tyre to the desired pressure.

The present invention seeks to provide a simple and cost-effective improvement on such prior devices.

SUMMARY OF THE INVENTION

According to the present invention there is provided a device for providing air under pressure to a rotating pneumatic tyre, the device comprising:—
(A) a pump which in use rotates with the tyre and which provides air under pressure to the tire when the pump is activated,
(B) a pump drive system for activating the pump upon a loss of pressure in the tyre, the pump drive system comprising;
(C) a first part that is rotationally connected to the tyre;
(D) a second part that rotates with the first part when the pump is inactive and which is inhibited from rotating with the first part to activate the pump, relative rotation between the first and second parts driving the pump to provide air under pressure to the tyre; and
(E) an electromagnetic clutch comprising a first plate which is non-rotatable and a second plate which rotates with said second part, said first plate being connected to said second plate electromagnetically when the clutch is engaged to prevent rotation of said first plate and said second part. Said clutch is preferably a hysterisis clutch.

In one form coils can be carried by one of said plates and there can be a battery pack and a switch for connecting said battery pack to said coils so that current flows through the coils.

In another form the device includes coils carried by one of said plates, magnets carried by the other of said plates, and switches for short-circuiting the coils so that rotation of the coils in proximity to the magnets induces current in the closed circuits constituted by the coils.

BRIEF DESCRIPTION OF THE SEVERAL VIEWS OF THE DRAWINGS

For a better understanding of the present invention, and to show how the same may be carried into effect, the invention will now be described by way of non-limiting example, with reference to the accompanying drawings in which.

DESCRIPTION OF SPECIFIC EMBODIMENTS OF THE INVENTION

Figure 1:
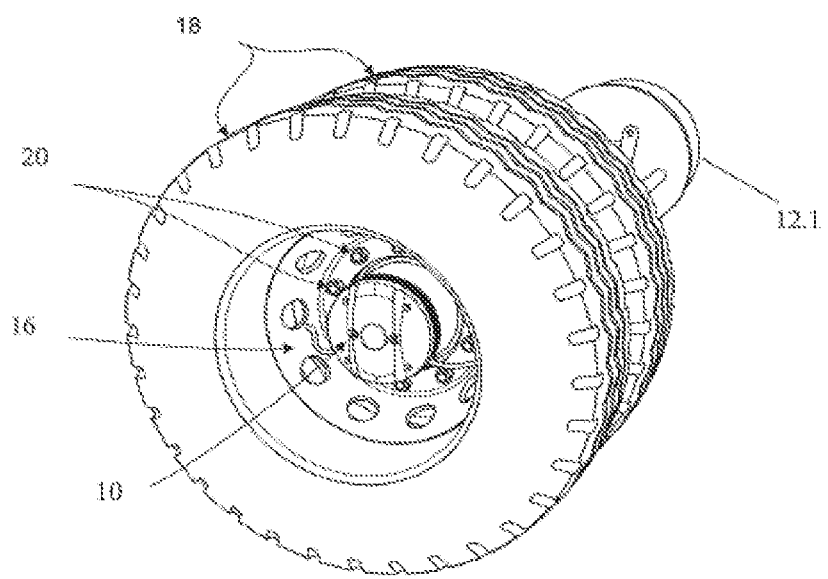
FIG. 1 is a perspective view of a pair of vehicle wheels, with a device according to the present invention fitted on a hub of the wheels.

Referring to the drawings, a device according to the present invention is generally indicated by reference numeral 10 and is shown in use, to provide fluid in the form of compressed air to a rotating element in the form of a pneumatic tyre.

Figure 2:
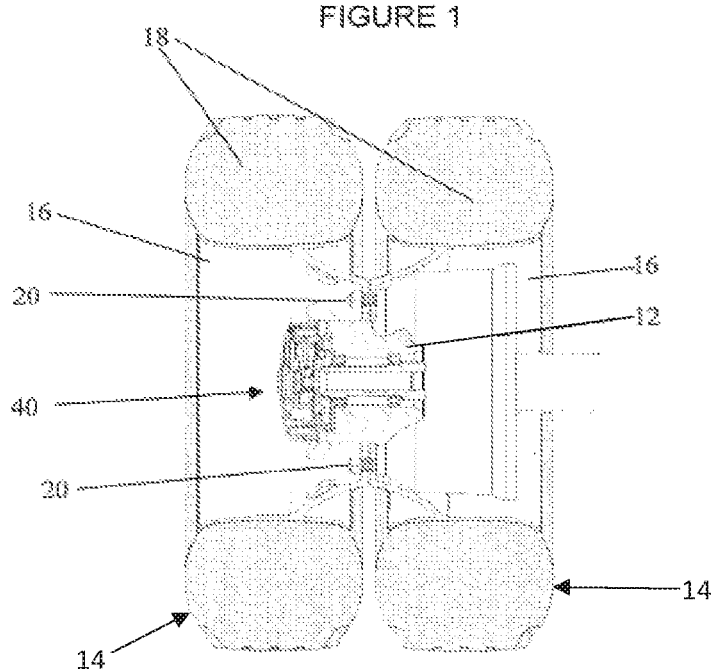
FIG. 2 is a sectional view of the pair of wheels and device of FIG. 1.

The device 10 is shown in FIGS. 1 and 2 integrated into the hub 12 of a pair of wheels 14. Each wheel 14 comprises a rim 16 with a pneumatic tyre 18 on it. The rims 16 are attached to the hub 12 by wheel nuts 20. In the illustrated example, the wheels are not driven e.g. they are for a heavy vehicle trailer. In FIG. 1, another hub 12.1 is shown. The hub 12.1 shares a common axle 22 with the hub 12.

Figure 3:
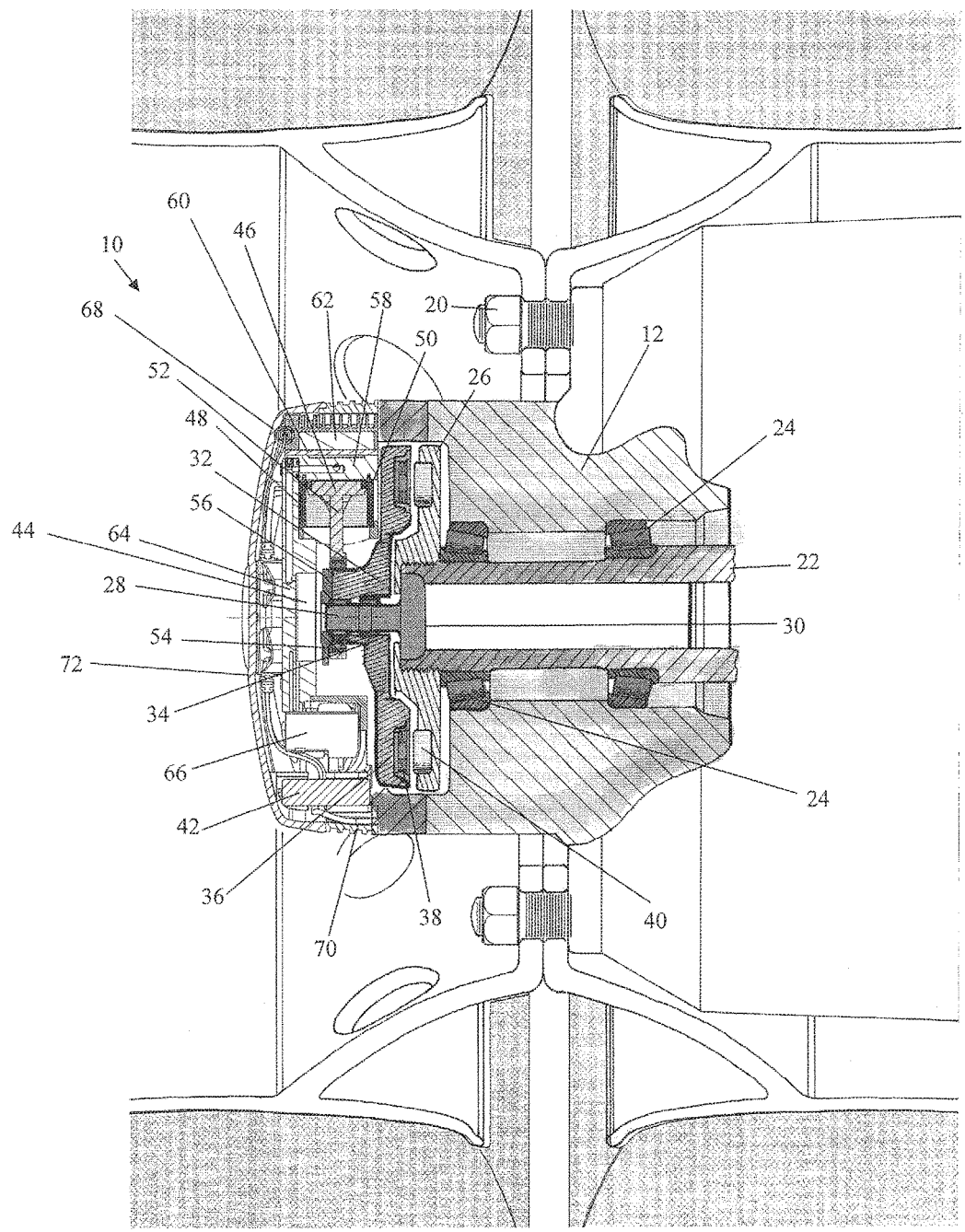
FIG. 3 is a detailed sectional view of the hub and the device of FIGS. 1 and 2 to a larger scale.

Referring to FIG. 3, the hub 12 is rotationally supported on the stationary hollow axle 22 by a pair of wheel bearings 24. The end of the axle 22 is threaded and a stator 26 is attached to its screw thread, thereby retaining the hub 12 and wheel bearings 24 in place on the axle 22. In preferred embodiments, the stator 26 is attached to the axle 22 using additional or other attachment means, to keep it secure, ensure correct axial orientation, etc. By virtue of its attachment to the axle 22, the stator 26 does not rotate with the hub 12 and is thus a stationary object.

A pump axle 28 is located at the end of the axle 22 and a head 30 of the pump axle 28 is held in position in a recess at the end of the axle 22, by the stator 26. The pump axle 28 extends outwards relative to the wheels i.e. to the left as shown in FIGS. 2 and 3 from the stator 26 and remains stationary with the axle 22 and stator 26. An eccentric body 32 is supported on the pump axle 28 to rotate around the pump axle on roller bearings 34. The body 32 includes a rotor 36, a plurality of alternator coils 38 being carried by the rotor 36. The coils are at the same radial distance from the axis of rotation as a plurality of alternator magnets 40 that are carried by the stator 26. When the hub 12 and wheels 14 rotate, the rotor 36 rotates with them and movement of the alternator coils 38 in close proximity to the magnets 40 induces current in the coils. The current is used to charge a battery pack 42 which provides power to electronics 44 of the device 10.

The device 10 includes a pump piston 46 that can reciprocate in a pump cylinder sleeve 48 with a pump piston seal 50 sealing between the pump piston and cylinder sleeve 48. The piston 46 is connected to the eccentric 32 body by a connecting rod 52, running on a big end bearing 54 that is held in place by an eccentric bearing plate 56. A compression chamber is formed between the piston 46, sleeve 48 and a cylinder head 58 that includes an air filter 60 including a foam filter element 62. The piston 46, cylinder sleeve 48, seal 50, cylinder head 58, etc. form a pump that is configured to provide compressed air to the tyres 18. The connecting rod 52 of the pump piston 46 forms a first part of a pump drive system and the eccentric body 32 forms a second part of the pump drive system. The pump drive system is configured to activate the pump when pressure in a tyre 18 drops below a predetermined threshold, as will be described below.

A pressure manifold 64 is provided and defines a number of flow passages, connectors etc. Three solenoid operated pneumatic valves 66 are provided. Only one of these can be seen in FIG. 3. They are controlled by the electronics 44. The operation of the pressure manifold 64 is substantially as described in more detail in PCT/IB2013/054732, apart from not being connected to a clutch piston, as will be evident from the functional description below. Suffice it to say that the manifold defines a cavity and connects two tyre pressure hoses (from the two tyres 18), the solenoid valves 66, two Schrader inflation valves and a pressure port from the compression chamber of the pump to a common cavity within the manifold.

Some of the ancillary features that are shown in FIG. 3 include an antenna 68 which allows the electronics 44 to communicate with external devices (e.g. with the vehicle's on-board computer); and wheel temperature and rotational speed sensors 70. Rotational speed is determined through a Hall effect sensor that senses rotation of a magnet attached to the stator 26. The parts of the device 10 on the outside of the rotor 36 (apart from the Schrader inflation valves) are protected by a cover 72.

In use, the entire device 10 normally rotates with the wheel hub 12, apart from the pump axle 28 and stator 26. The eccentric body 32 and rotor 36 also rotate with the hub 12.

When tyre pressure in a tyre drops below a predetermined pressure, direct current from the battery pack 42 is fed through the coils 38 to create an electromagnetic flux. The stator 26 is within the magnetic field created by the flux and is magnetised so that it resists rotation of the rotor 36 due to its hysteretic properties. The rotor 36, coils 38 and stator 26 thus act as a hysteresis powered electromagnetic clutch except that the stator 26 acts as the hysteresis disc, whereas this function is conventionally fulfilled by a "rotor". When the clutch is engaged, the rotor 36 and eccentric body 32 no longer rotate with the hub 12, but are held stationary, with the stator 26.

While the eccentric body 32 is held stationary by engagement of the clutch, the remainder of the device 10 continues its rotation and the relative rotation between the big end of the connecting rod 52 and the eccentric body 32 causes the connecting rod 52 and pump piston 46 to reciprocate within the pump's cylinder sleeve 48. The pump is thus activated and supplies compressed air that is directed via the pressure manifold 64 to the underinflated tyre 18.

When the tyre pressure reaches a predetermined level, the tyre pressure is disconnected from the manifold 64 and current to the coils 38 ceases, so that the clutch disengages and the device 10 is returned to its normal state.

In an alternative embodiment, instead of engaging the clutch by passing current from the battery pack 42 through the coils 38, the output of the coils are short-circuited, with the result that rotation of the coils in proximity to the magnets 40 induces current in the closed circuits in the coils. These generate magnetic forces opposing rotation and thus holds the rotor 36 stationary relative to the stator 26. To release the clutch, the outputs from the coils 38 are simply opened.

The invention claimed is:

1. A device for providing air under pressure to a rotating pneumatic tyre, the device comprising:
    (A) a pump which in use rotates with the tyre and which provides air under pressure to the tyre when the pump is activated,
    (B) a pump drive system for activating the pump upon a loss of pressure in the tyre, the pump drive system comprising;—
    (C) a first part that is rotationally connected to the tyre;
    (D) a second part that rotates with the first part when the pump is inactive and which is inhibited from rotating with the first part to activate the pump, relative rotation between the first and second parts driving the pump to provide air under pressure to the tyre; and
    (E) an electromagnetic clutch comprising a first plate which is non-rotatable and a second plate which rotates with said second part, said first plate being connected to said second plate electromagnetically when the clutch is engaged to prevent rotation of said first plate and said second part.

2. A device as claimed in claim 1, wherein said clutch is a hysterisis clutch.

3. A device as claimed in claim 2, and including coils carried by one of said plates, a battery pack and a switch for connecting said battery pack to said coils so that current flows through the coils.

4. A device as claimed in claim 2, and including coils carried by one of said plates, magnets carried by the other of said plates, and switches for short-circuiting the coils to form closed circuits so that rotation of the coils in proximity to the magnets induces current in the closed circuits constituted by the coils.

5. A device as claimed in claim 1, and including coils carried by one of said plates, a battery pack and a switch for connecting said battery pack to said coils so that current flows through the coils.

6. A device as claimed in claim 1, and including coils carried by one of said plates, magnets carried by the other of said plates, and switches for short-circuiting the coils to form closed circuits so that rotation of the coils in proximity to the magnets induces current in the closed circuits constituted by the coils.

\* \* \* \* \*